(12) United States Patent
Fuqua et al.

(10) Patent No.: US 8,250,963 B2
(45) Date of Patent: Aug. 28, 2012

(54) VEHICLE-MOUNTED PERSONNEL ACCESS PLATFORM ASSEMBLY WITH BALLISTIC PROTECTION

(75) Inventors: Charles Louis Fuqua, Woodbridge, VA (US); Steven Scott Kahre, Spotsylvania, VA (US)

(73) Assignee: Patriot3, Inc., Fredericksburg, VA (US)

( * ) Notice: Subject to any disclaimer, the term of this patent is extended or adjusted under 35 U.S.C. 154(b) by 253 days.

(21) Appl. No.: 12/449,883

(22) PCT Filed: Aug. 21, 2007

(86) PCT No.: PCT/US2007/018563
§ 371 (c)(1),
(2), (4) Date: Mar. 1, 2010

(87) PCT Pub. No.: WO2008/123860
PCT Pub. Date: Oct. 16, 2008

(65) Prior Publication Data
US 2010/0163341 A1    Jul. 1, 2010

Related U.S. Application Data

(60) Provisional application No. 60/921,943, filed on Apr. 5, 2007.

(51) Int. Cl.
*F41H 5/14* (2006.01)
*F41H 13/00* (2006.01)
*B60R 9/02* (2006.01)

(52) U.S. Cl. .............. 89/36.09; 89/36.07; 89/36.08; 89/36.15; 89/929; 89/936; 182/129

(58) Field of Classification Search ............. 89/36.07, 89/36.08, 36.09, 36.15; 182/129, 150
See application file for complete search history.

(56) References Cited

U.S. PATENT DOCUMENTS

| | | | | | |
|---|---|---|---|---|---|
| 1,203,962 | A | * | 11/1916 | Bellamore | 109/79 |
| 1,319,943 | A | * | 10/1919 | Bessolo | 182/129 |
| 1,501,790 | A | * | 7/1924 | McClay et al. | 180/318 |
| 2,396,073 | A | * | 3/1946 | Barnes | 89/36.08 |
| 4,282,794 | A | * | 8/1981 | Miller et al. | 89/36.15 |
| 4,309,055 | A | * | 1/1982 | Law | 296/63 |
| 4,351,558 | A | * | 9/1982 | Mueller | 296/203.01 |
| 4,416,485 | A | * | 11/1983 | Long | 296/187.03 |
| 2005/0235819 | A1 | * | 10/2005 | Long | 89/36.07 |
| 2006/0254412 | A1 | * | 11/2006 | Long | 89/36.07 |
| 2007/0006724 | A1 | * | 1/2007 | Strong | 89/36.08 |

* cited by examiner

*Primary Examiner* — Bret Hayes
(74) *Attorney, Agent, or Firm* — Schwartz Law Firm, P.C.

(57) ABSTRACT

A vehicle-mounted personnel access platform assembly with ballistic protection is designed for mounting on a tactical vehicle. The platform assembly includes at least one mounting brace, and at least one access platform carried by the mounting brace. The access platform defines a raised horizontal surface for supporting personnel at an elevated location adjacent a body of the tactical vehicle. A ballistic wall adjacent the access platform is adapted for residing a spaced distance from the body of the tactical vehicle to protect personnel staged on the access platform.

13 Claims, 8 Drawing Sheets

VEHICLE-MOUNTED PERSONNEL ACCESS PLATFORM ASSEMBLY WITH BALLISTIC PROTECTION

TECHNICAL FIELD AND BACKGROUND

The present disclosure relates generally to the ballistics industry, and more specifically, to a vehicle-mounted personnel access platform with ballistic protection.

SUMMARY OF EXEMPLARY EMBODIMENTS

Various exemplary embodiments of the present invention are described below. Use of the term "exemplary" means illustrative or by way of example only, and any reference herein to "the invention" is not intended to restrict or limit the invention to exact features or steps of any one or more of the exemplary embodiments disclosed in the present specification.

According to one exemplary embodiment, the invention comprises a vehicle-mounted personnel access platform assembly with ballistic protection. The platform assembly is adapted for mounting on a tactical vehicle and includes at least one mounting brace, and at least one access platform carried by the mounting brace. The access platform defines a raised horizontal surface for supporting personnel at an elevated location adjacent a body of the tactical vehicle. A ballistic wall adjacent the access platform is adapted for residing a spaced distance from the body of the tactical vehicle to protect personnel staged on the access platform.

According to another exemplary embodiment, the mounting brace includes an elongated vertical support defining a plurality of vertically-spaced mounting holes. The mounting holes form respective elevation selection points designed to locate the access platform at one of a number of different elevations.

According to another exemplary embodiment, the mounting brace further includes a horizontal bracket attached to the vertical support at a selected one of the mounting holes.

According to another exemplary embodiment, the mounting brace further includes an angled bracket attached to a distal end of the horizontal bracket and to a selected second one of the mounting holes.

According to another exemplary embodiment, the access platform includes a generally rectangular foot tread having opposing longitudinal front and back ends, and opposing side ends.

According to another exemplary embodiment, at least one wall standard is attached to the mounting brace, and includes means for holding the ballistic wall vertically relative to the tactical vehicle.

According to another exemplary embodiment, the wall standard has a substantially vertical lower section and an outwardly angled upper section.

According to another exemplary embodiment, the ballistic wall includes a generally horizontal reinforcing bar attached to a personnel-side surface of the ballistic wall. The reinforcing bar extends substantially from one end of the ballistic wall to an opposite end of the ballistic wall. The term "substantially" as used herein is broadly defined to mean greater than one-half of a distance or an amount.

According to another exemplary embodiment, the means for holding the ballistic wall comprises a wall securing edge formed at a top end of the wall standard. The wall securing edge engages the reinforcing bar to vertically hang the ballistic wall adjacent the access platform. Other "means for holding" may comprise, for example, any hardware, hinges, bolts, welding, hooks, braces, brackets, plates, supports, and the like.

According to another exemplary embodiment, the ballistic wall is pivotably supported at the wall securing edge of the wall standard.

According to another exemplary embodiment, a personnel passageway is formed between the ballistic wall and the access platform to facilitate rapid deployment of personnel from behind the ballistic wall.

According to another exemplary embodiment, the ballistic wall is constructed of high performance fibers having a tensile strength greater than 7 grams/denier.

According to another exemplary embodiment, the ballistic wall is constructed of a rigid ceramic material.

In another exemplary embodiment, the invention comprises a tactical vehicle which incorporates a personnel access platform assembly with ballistic protection. The term "tactical vehicle" refers broadly herein to any self-propelled, boosted, or towed military and non-military (e.g., police) conveyance capable of transport by land, sea, or air. The vehicle may have wheels, tracks, skids, floats, and/or other maneuvering structure.

BRIEF DESCRIPTION OF THE DRAWINGS

The description of exemplary embodiments proceeds in conjunction with the following drawings, in which.

DESCRIPTION OF EXEMPLARY EMBODIMENTS AND BEST MODE

The present invention is described more fully hereinafter with reference to the accompanying drawings, in which one or more exemplary embodiments of the invention are shown. Like numbers used herein refer to like elements throughout. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention, which is to be given the full breadth of the appended claims and any and all equivalents thereof. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at lease one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterite) is not intended to indicate or imply that the invention has been previously reduced to practice or that any testing has been performed.

Figure 1:
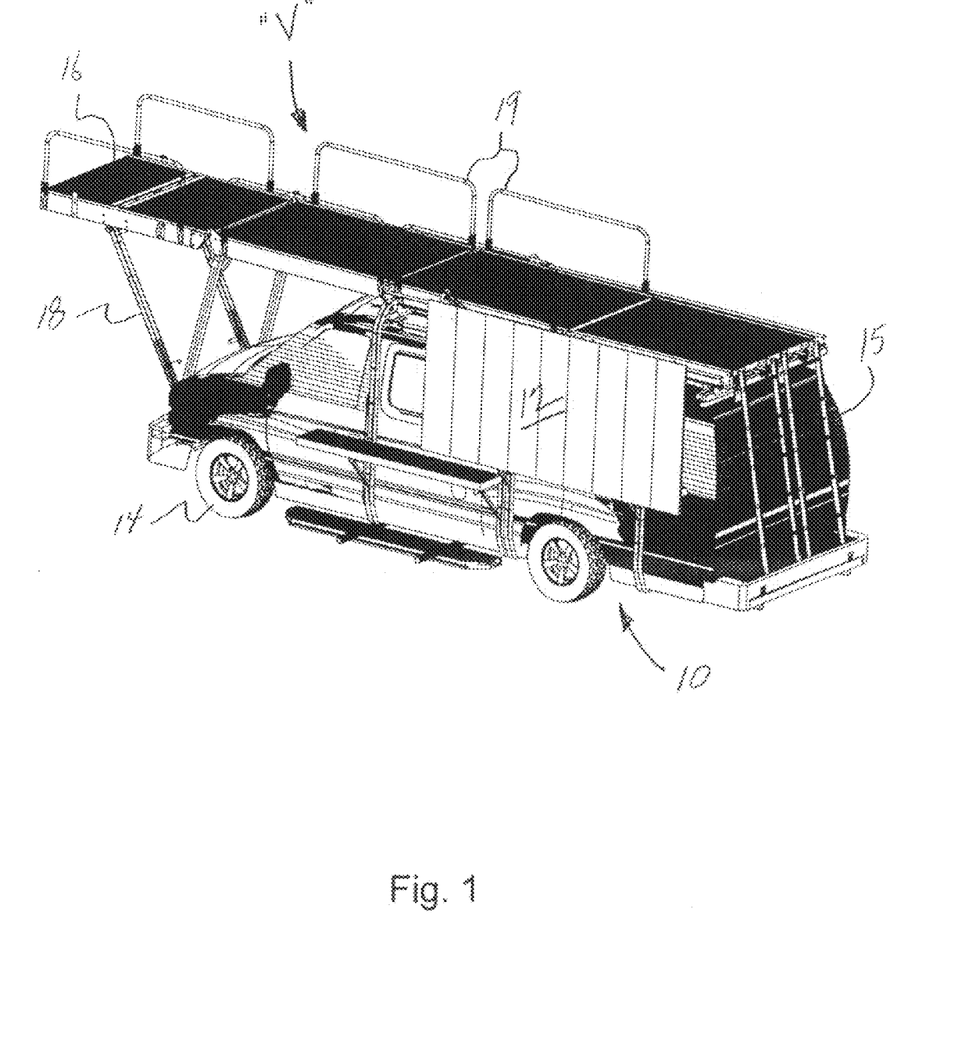
FIG. 1 is a perspective view a tactical vehicle incorporating a vehicle-mounted personnel access platform assembly with ballistic protection according to one exemplary embodiment of the present invention.
Figure 2:
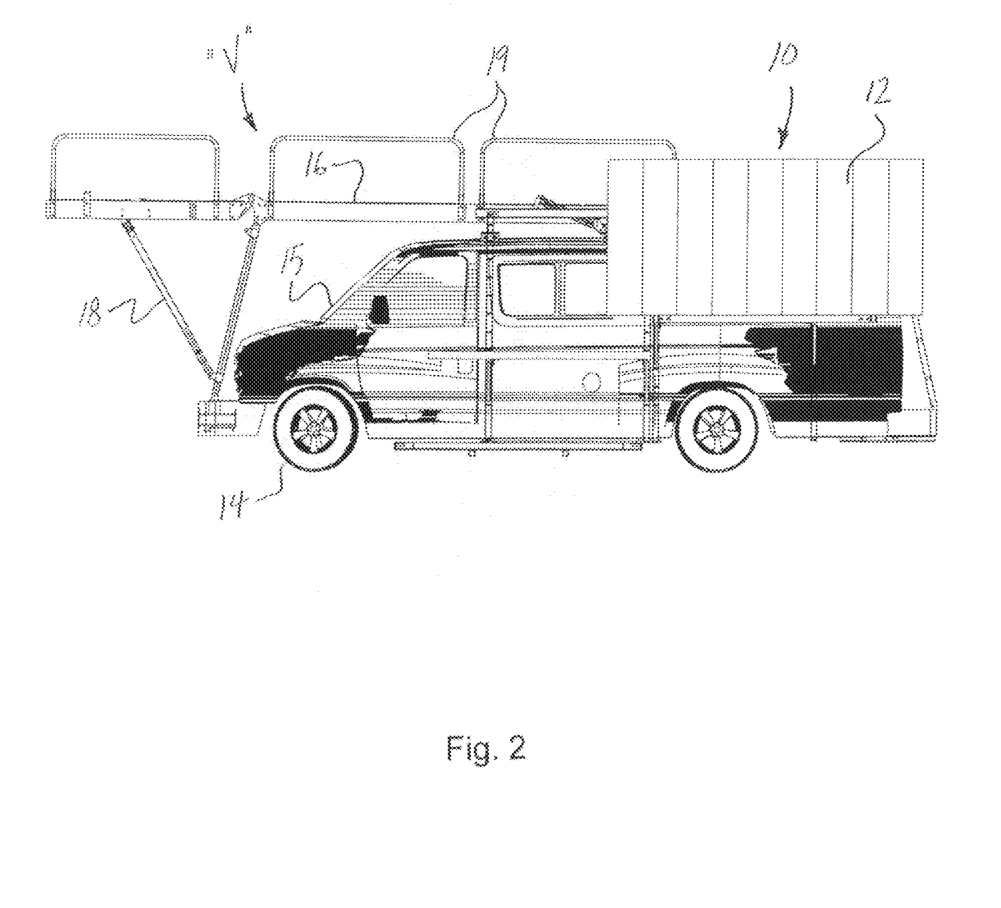
FIG. 2 is side elevation of the vehicle.
Figure 3:
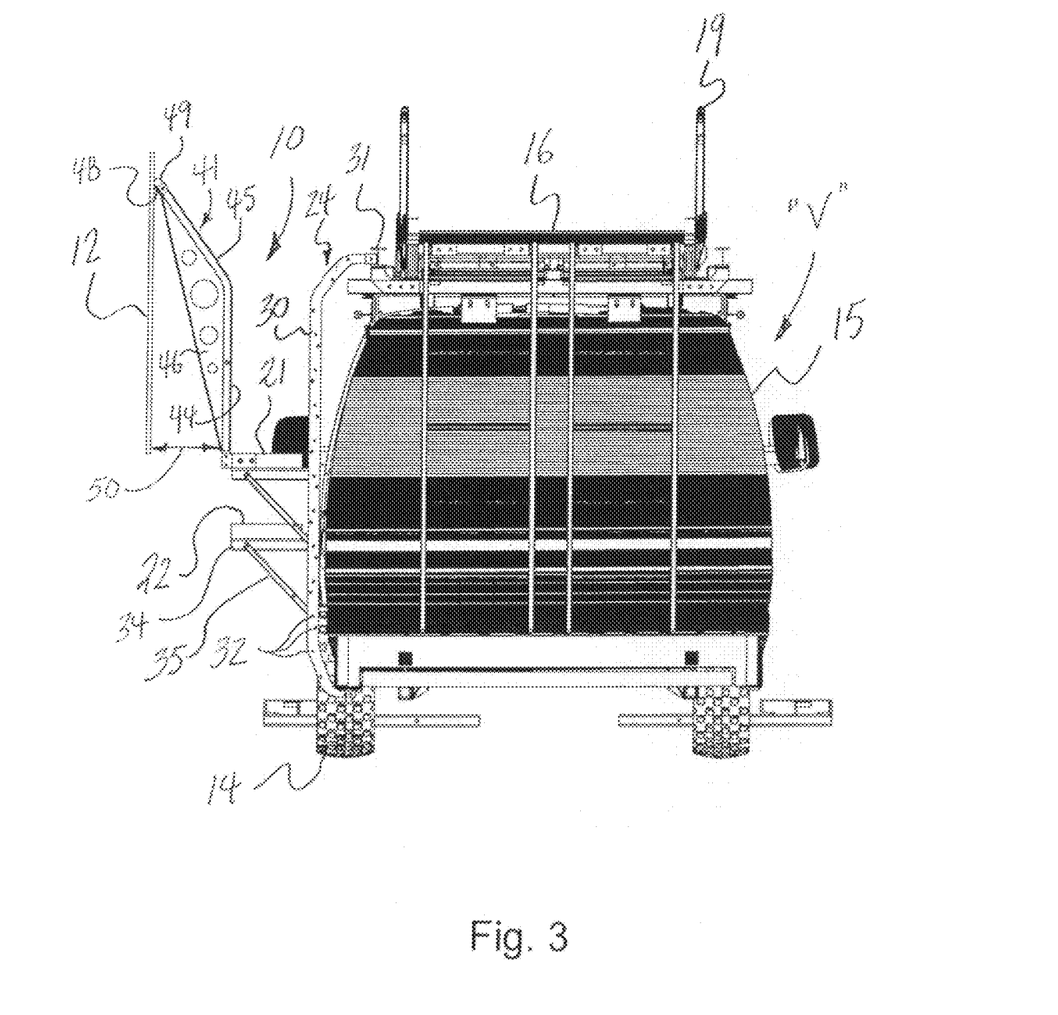
FIG. 3 is an end view of the vehicle.
Figure 4:
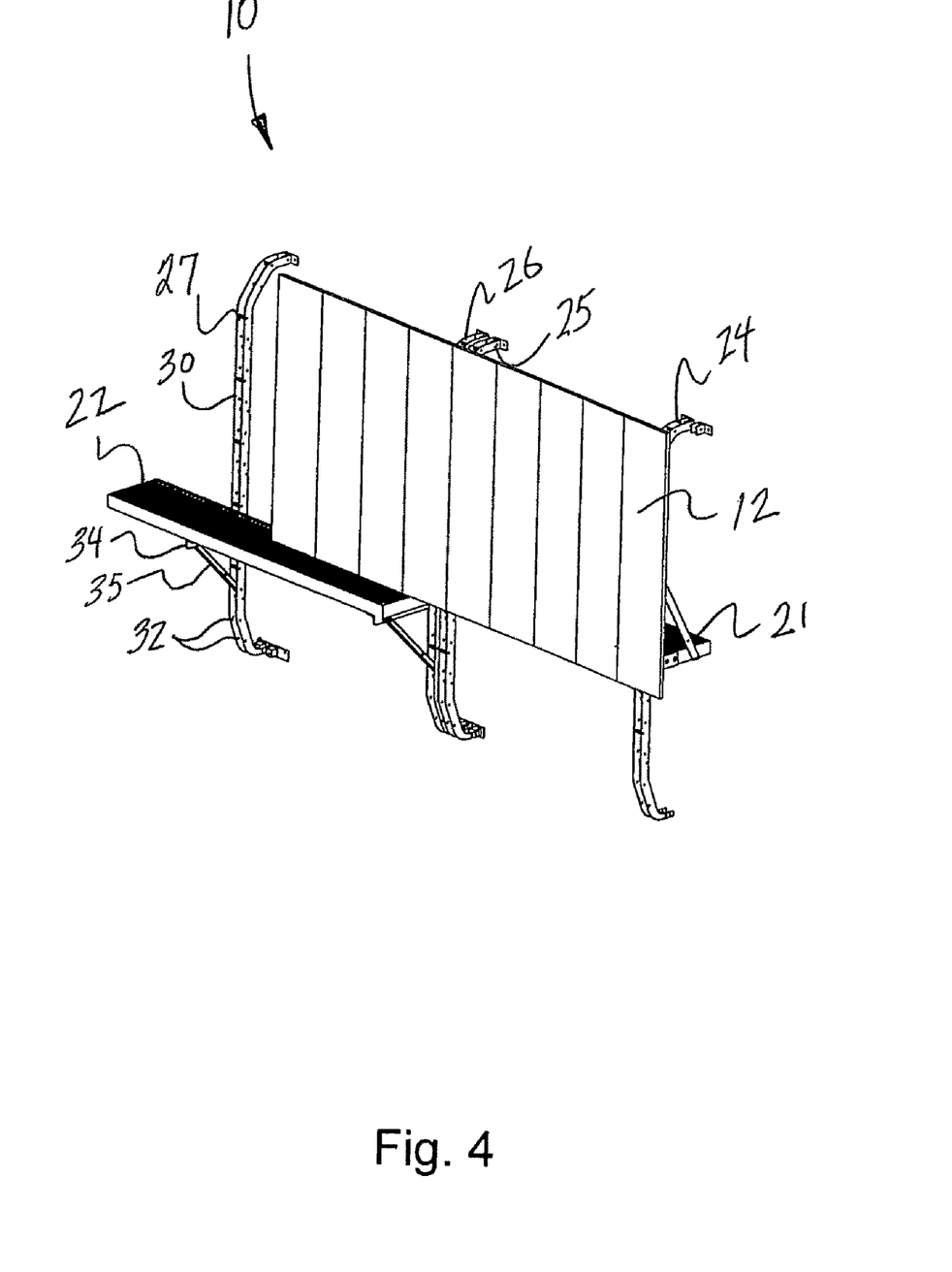
FIG. 4 is a perspective view the platform assembly removed from the vehicle.
Figure 5:
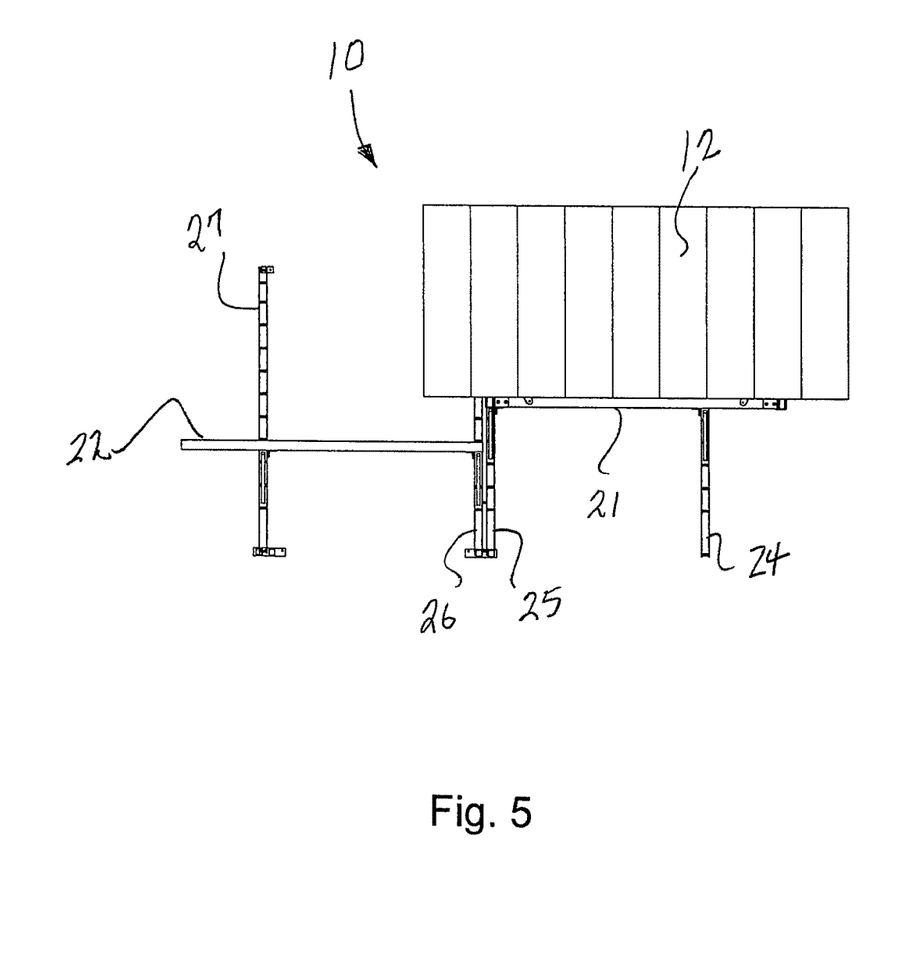
FIG. 5 is a threat-side view of the assembly removed from the vehicle.
Figure 6:
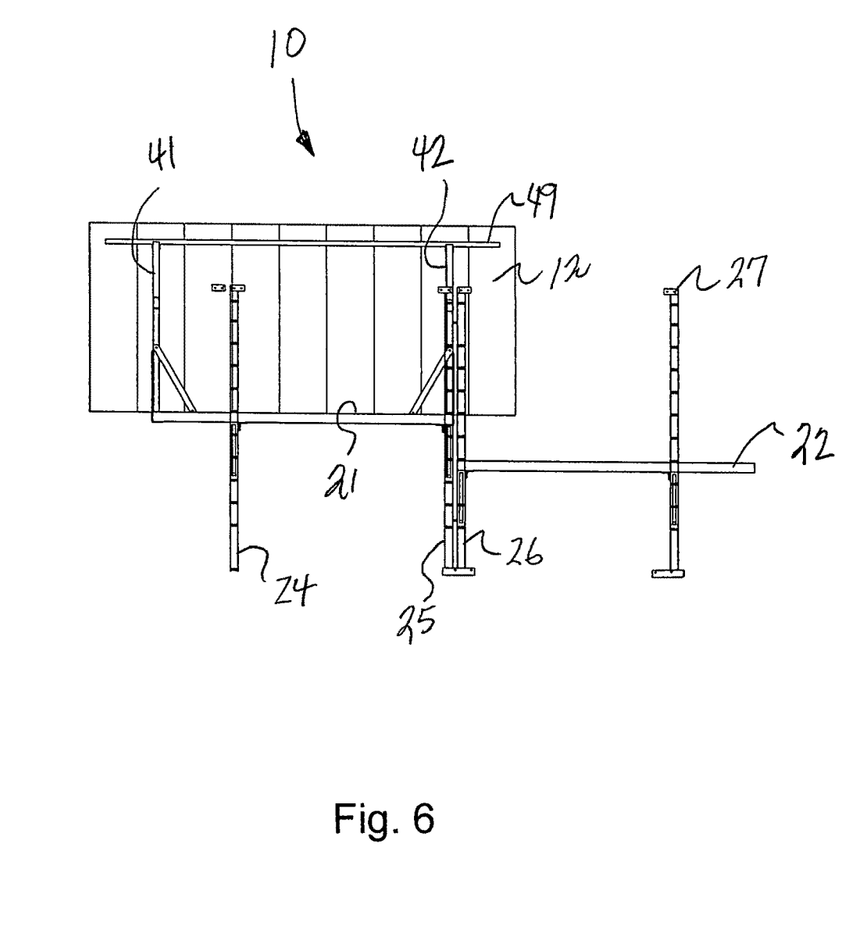
FIG. 6 is a personnel-side (or protected-side) view of the assembly removed from the vehicle.

Referring now specifically to the drawings, FIGS. 1-3 illustrate an exemplary embodiment of a tactical self-propelled motor vehicle "V" incorporating a vehicle-mounted personnel access platform assembly with ballistic protection. The platform assembly is indicated generally at reference numeral 10. The ballistic protection may comprise, for example, a hard or soft armor ballistic wall 12. In addition to the assembly 10, the tactical vehicle "V" may comprise wheels 14 and a vehicle body 15 including side doors and windows, and other generally conventional parts and assemblies (not shown) including, for example, a heavy duty chassis, suspension, engine, clutch, gears, differential, drive shaft, driveline, drive train, transmission, and axles.

In the exemplary embodiment shown, the tactical vehicle "V" further comprises an elevated personnel deck 16 (or ramp) carried by a vehicle-mount frame assembly 18, and defining a substantially flat and continuous deck surface for supporting personnel. The elevated deck 16 extends from the front to the rear of the vehicle "V", and may comprise safety rails 19 and one or more adjustable or pivoted deck sections. For example, the front ramp may be designed to pivot and elevate via one or more hydraulic actuators (not shown). One example of an adjustable front end ramp system applicable for use in the present vehicle is described in Applicant's prior issued patent, U.S. Pat. No. 6,832,667. The complete disclosure of this prior patent is incorporated herein by reference.

Referring to FIGS. 3-8, the present platform assembly 10 comprises a selected arrangement of elevated horizontal access platforms 21, 22. Each access platform 21, 22 may include a generally rectangular foot tread having opposing longitudinal front and back ends, and opposing side ends. The access platforms 21, 22 are carried by respective pairs of vertical mounting braces 24, 25, 26, and 27 attached at one side of the vehicle "V"; each mounting brace 24-27 comprising a generally C-shaped elongated support 30 (or "stringer"). In one embodiment, the top end of each support 30 is bolted to a horizontal I-beam 31 (FIG. 3) fixed to the roof of the vehicle "V" adjacent the personnel deck 16, while the bottom end is bolted to the vehicle chassis. Each mounting brace 24-27 defines a series of vertically-spaced holes 32, and a bracket assembly comprising cooperating horizontal and angled support brackets 34 and 35. The horizontal and angled brackets 34, 35 attach directly to the vertical support 30 using, for example, removable bolts or pins (not shown) passed through the brackets 34, 35 and into, or through, selected mounting holes 32. The angled bracket 35 extends from a distal end of the horizontal bracket 34 to the vertical support 30. Once located on the vertical support 30, a second identical bracket assembly may be attached at an identical elevation to a second mounting brace 24-27 secured to the vehicle "V". One or more platforms 21, 22 extend between the spaced mounting braces 24-27, and are vertically supported (at least in part) by the bracket assemblies. The load capacity at any point along a platform 21, 22 may be in the range of 250-1000 pounds. The elevations of the platforms 21, 22 may be readily modified in the field by adjusting the location of each horizontal bracket 34 along respective lengths of the vertical supports 30. The platforms 21, 22 may rest freely on the horizontal brackets 34, or may be more securely attached using appropriate hardware, ties, straps, welding, or other means.

Figure 7:
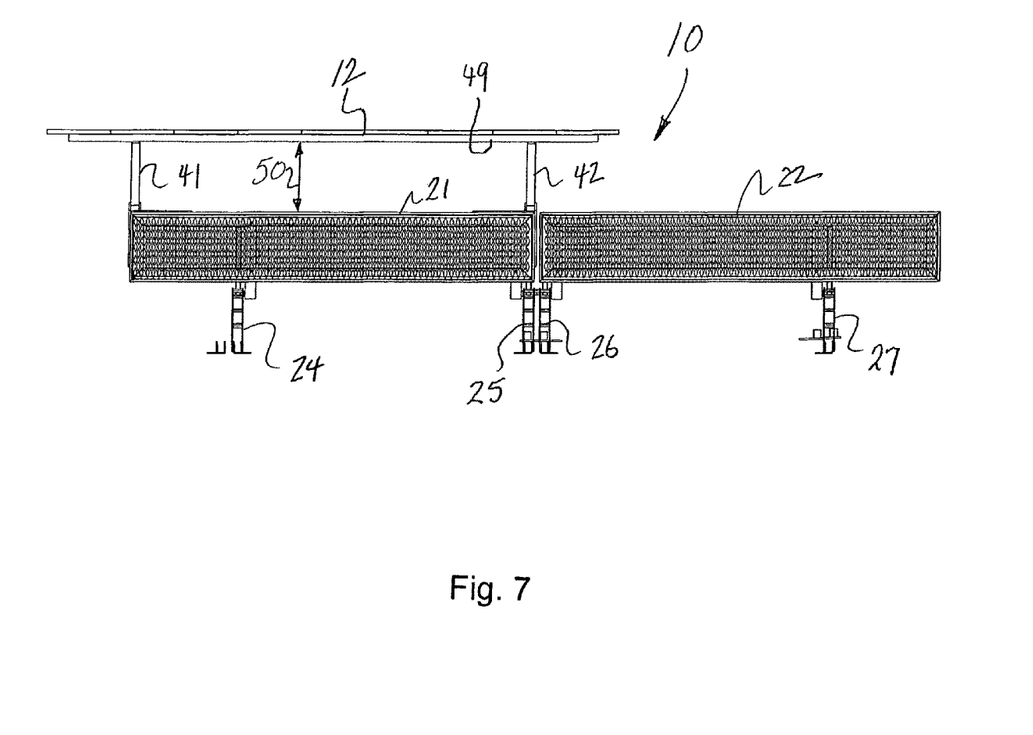
FIG. 7 is a top view of the assembly removed from the vehicle.
Figure 8:
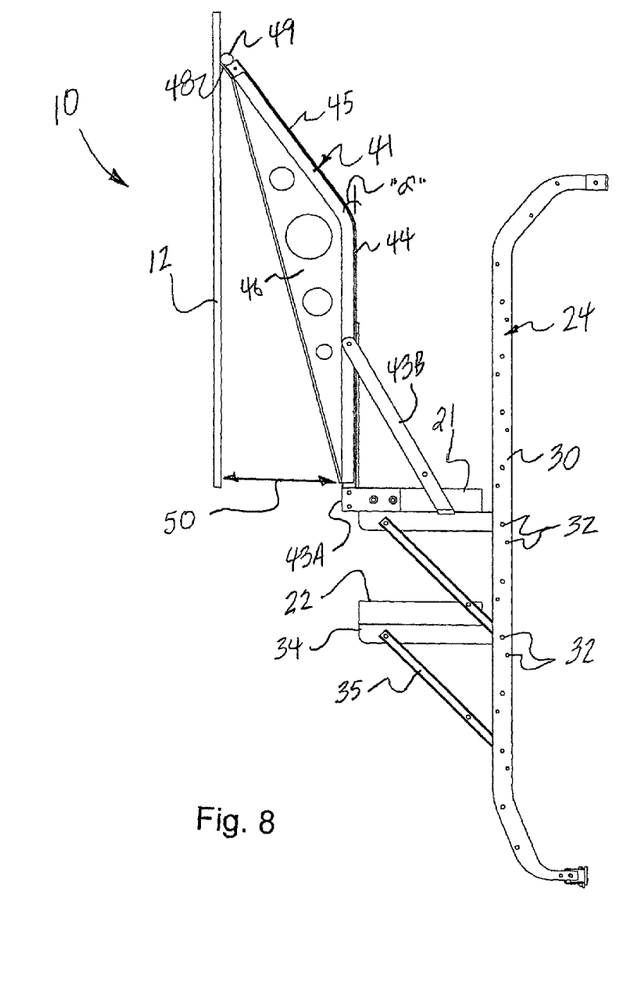
FIG. 8 is a side view of the assembly removed from the vehicle.

As best shown in FIGS. 3 and 8, the ballistic wall 12 may be located adjacent an area of the platforms 21, 22, and spaced-apart from the body 15 of the tactical vehicle "V" to form a protected personnel access (or staging) location. In the present embodiment, the ballistic wall 12 is carried by a pair of vertical wall standards 41, 42 attached to opposite ends of a single platform 21 using, for example, mounting plates and angled brackets 43A and 43B (See FIG. 8). Each standard 41, 42 may comprise a substantially vertical lower section 44, an outwardly angled upper section 45, and a perforated reinforcing web 46. The upper section 45 is formed at an angle ("α") of approximately 30 degrees, and comprises a wall-hanging end edge 48 designed to engage a generally horizontal reinforcing bar 49 affixed to a personnel-side surface of the ballistic wall 12. The reinforcing bar 49 is located proximate a top of the wall 12, and may extend substantially from one end of the wall to the other. By this exemplary construction, the ballistic wall 12 hangs vertically from the cooperating wall standards 41, 42, and is substantially spaced from the access platform 21 to form a sizeable zone of safety sufficient to accommodate one or more individuals, gear, and equipment. As best shown in FIGS. 3, 7, and 8, the unobstructed space between a bottom end of the ballistic wall 12 and a front edge of the access platform 21 defines a deployment passageway 50 for conveniently transferring personnel, gear and equipment to and from the elevated platforms 21, 22. Additionally, the ballistic wall 12 may be freely pivotable at the reinforcing bar 49, and readily lifted and removed from the wall standards 41, 42 to facilitate more rapid deployment. Alternatively, the ballistic wall 12 may be more securely mounted using brackets, braces, and other hardware.

The ballistic wall 12 may be constructed of any suitable hard and/or soft armor material including, for example, ceramics, Kevlar®, Twaron®, aramid fibers, HDPE, or other high performance fiber having a tensile strength greater than 7 grams/denier. The platform assembly 10 can be removed and/or installed on either side or end of the tactical vehicle "V". In various exemplary implementations, the platform assembly 10 may provide a protected staging location for military personnel at heights of 6-12 feet, and is applicable in law enforcement for police access to bus and perimeter security.

Exemplary embodiments of the present invention are described above. No element, act, or instruction used in this description should be construed as important, necessary, critical, or essential to the invention unless explicitly described as such. Although only a view of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under §112, 6th paragraph is not intended. Additionally, it is not intended that the scope of patent protection afforded the present invention be defined by reading into any claim a limitation found herein that does not explicitly appear in the claim itself.

We claim:

1. A vehicle-mounted personnel access platform assembly with ballistic protection, said platform assembly adapted for mounting on a tactical vehicle and comprising:
    at least one mounting brace;
    at least one access platform carried by said mounting brace and defining a raised horizontal surface for supporting personnel at an elevated location adjacent a body of the tactical vehicle;
    a ballistic wall adjacent said access platform, and adapted for residing a spaced distance from the body of the tactical vehicle to protect personnel staged on said access platform, and said ballistic wall comprising a generally horizontal reinforcing bar attached to a personnel-side surface of said ballistic wall, and extending substantially from one end of said ballistic wall to an opposite end of said ballistic wall; and
    at least one wall standard attached to said mounting brace for holding said ballistic wall, and comprising a substantially vertical lower section and an outwardly angled upper section; and
    a wall securing edge formed at a top end of said wall standard, and engaging said horizontal reinforcing bar to vertically hang said ballistic wall adjacent said access platform.

2. A personnel access platform assembly according to claim 1, wherein said mounting brace comprises an elongated vertical support defining a plurality of vertically-spaced mounting holes, said mounting holes forming respective elevation selection points designed to locate said access platform at one of a number of different elevations.

3. A personnel access platform assembly according to claim 2, wherein said mounting brace further comprises a horizontal bracket attached to said vertical support at a selected one of said mounting holes.

4. A personnel access platform assembly according to claim 3, wherein said mounting brace further comprises an angled bracket attached to a distal end of said horizontal bracket and to a selected second one of said mounting holes.

5. A personnel access platform assembly according to claim 1, wherein said access platform comprises a generally rectangular foot tread having opposing longitudinal front and back ends, and opposing side ends.

6. A personnel access platform assembly according to claim 1, wherein said ballistic wall is pivotably supported at the wall securing edge of said wall standard.

7. A personnel access platform assembly according to claim 1, and comprising a deployment passageway formed between said ballistic wall and said access platform to facilitate rapid deployment of personnel from behind said ballistic wall.

8. A personnel access platform assembly according to claim 1, wherein said ballistic wall comprises high performance fibers having a tensile strength greater than 7 grams/denier.

9. A personnel access platform assembly according to claim 1, wherein said ballistic wall comprises a rigid ceramic material.

10. In combination with a tactical vehicle, a personnel access platform assembly with ballistic protection, said platform assembly comprising:
    at least one mounting brace attached to said tactical vehicle;
    at least one access platform carried by said mounting brace and defining a raised horizontal surface for supporting personnel at an elevated location adjacent a body of said tactical vehicle;
    a ballistic wall adjacent said access platform, and residing a spaced distance from the body of said tactical vehicle to protect personnel staged on said access platform, and said ballistic wall comprising a generally horizontal reinforcing bar attached to a personnel-side surface of said ballistic wall, and extending substantially from one end of said ballistic wall to an opposite end of said ballistic wall; and
    at least one wall standard attached to said mounting brace for holding said ballistic wall, and comprising a substantially vertical lower section and an outwardly angled upper section; and
    a wall securing edge formed at a top end of said wall standard, and engaging said horizontal reinforcing bar to vertically hang said ballistic wall adjacent said access platform.

11. A tactical vehicle according to claim 10, wherein said mounting brace comprises an elongated vertical support defining a plurality of vertically-spaced mounting holes, said mounting holes forming respective elevation selection points designed to locate said access platform at one of a number of different elevations.

12. A tactical vehicle according to claim 11, wherein said mounting brace further comprises a horizontal bracket attached to said vertical support at a selected one of said mounting holes, and an angled bracket attached to a distal end of said horizontal bracket and to a selected second one of said mounting holes.

13. A tactical vehicle according to claim 10, and comprising a deployment passageway formed between said ballistic wall and said access platform to facilitate rapid deployment of personnel from behind said ballistic wall.

* * * * *